United States Patent
Naar et al.

(10) Patent No.: US 6,809,426 B2
(45) Date of Patent: Oct. 26, 2004

(54) GRAVITY-BASED VEHICLE POWER SYSTEM

(76) Inventors: Claude A. Naar, 4897 NW. 6th Ct., Plantation, FL (US) 33317; Josseth J. Naar, 4897 NW. 6th Ct., Plantation, FL (US) 33317

( * ) Notice: Subject to any disclaimer, the term of this patent is extended or adjusted under 35 U.S.C. 154(b) by 0 days.

(21) Appl. No.: 10/336,544

(22) Filed: Jan. 6, 2003

(65) Prior Publication Data

US 2004/0130157 A1 Jul. 8, 2004

(51) Int. Cl.⁷ .............................................. H02P 9/04
(52) U.S. Cl. ....................... 290/1 R; 180/302; 180/308; 180/65.5
(58) Field of Search ....................... 310/75 C; 290/1 R; 180/305, 308, 65.5

(56) References Cited

U.S. PATENT DOCUMENTS

| | | |
|---|---|---|
| 1,574,095 A | 2/1926 | Jokisch |
| 3,699,367 A | 10/1972 | Thomas |
| 3,760,351 A | 9/1973 | Thomas |
| 4,061,200 A | 12/1977 | Thompson |
| 4,429,232 A * | 1/1984 | Thomas ........................ 29/1 R |
| 4,893,877 A * | 1/1990 | Powell ........................ 310/108 |
| 5,323,688 A | 6/1994 | Walker |
| 5,590,734 A | 1/1997 | Caires |
| 5,631,507 A * | 5/1997 | Bajric ........................ 310/67 |
| 5,767,663 A | 6/1998 | Lu |
| 5,901,804 A | 5/1999 | Shimshi |
| 5,931,249 A | 8/1999 | Ellis et al. |
| 6,138,781 A | 10/2000 | Hakala |
| 6,291,901 B1 | 9/2001 | Cefo |

* cited by examiner

Primary Examiner—Nicholas Ponomarenko
Assistant Examiner—Iraj A. Mohandesi
(74) Attorney, Agent, or Firm—Oltman, Flynn & Kubler

(57) ABSTRACT

A gravity-fed, tire pumped, vehicle energy generating power wheel includes an axle on a vehicle; a wheel on the axle; a tire on the wheel having deflection characteristics; a pump mechanism for activation by the tire when the tire is characterized by the deflection; the pump mechanism operating via a mechanical linkage, the operation of the mechanical linkage being activated by a ratcheting gear system operable by the deflection; and the mechanical linkage activating at least one of: power generator, at least one hydraulic motor and at least one pneumatic power device.

19 Claims, 9 Drawing Sheets

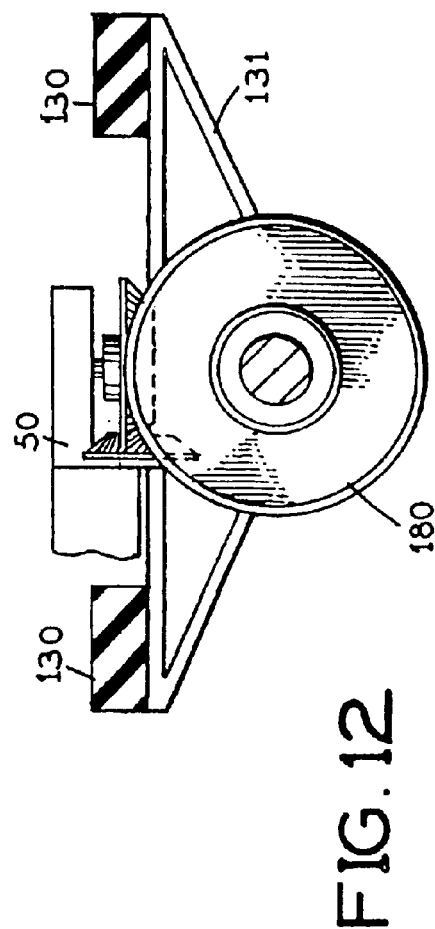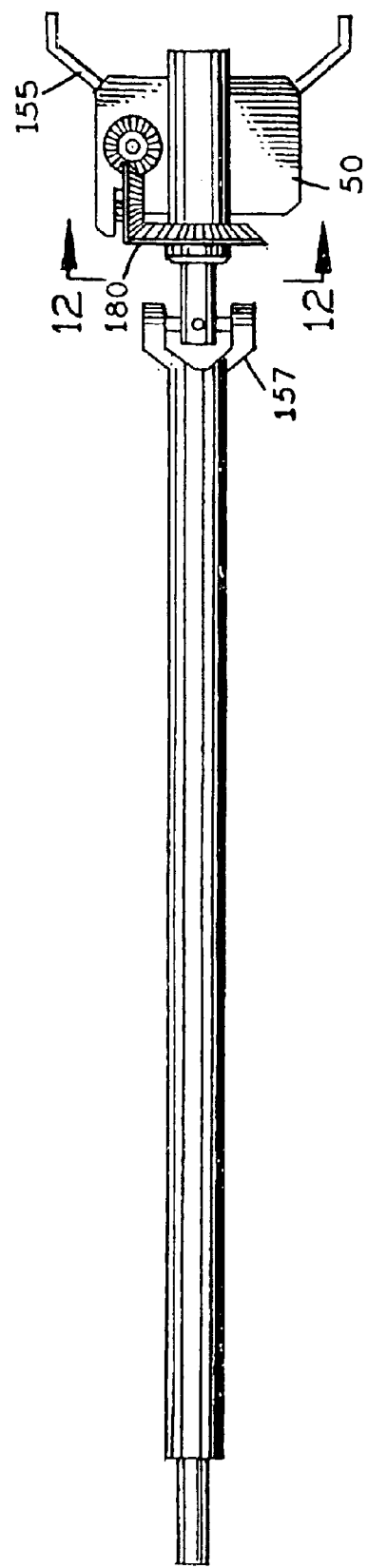

GRAVITY-BASED VEHICLE POWER SYSTEM

FIELD OF THE INVENTION

The invention relates generally to improvements in vehicular energy generating systems and more particularly to mechanical means and preferably hydraulic pumps inside its tires for recovering wasted tire flexure energy and putting that recovered energy to useful work.

DESCRIPTION OF THE PRIOR ART

The prior art has numerous methods for recovering lost tire flexure energy. Most are highly complex, requiring many parts and thus expensive to produce.

U.S. Pat. No. 1,574,095 to Jokisch for an electric generator powered by the vibrations of a vehicle's body and wheels. Ratchet movements resulting from the vibrations actuating linkages drive the generator.

U.S. Pat. No. 4,061,200 to Thompson uses spring-loaded bellows in the tire to operate a pump to drive a fluid motor.

U.S. Pat. No. 3,699,367 to Thomas uses tire flexure to operate plungers which rotate a cog that turns a generator drive shaft.

U.S. Pat. No. 3,760,351 to Thomas uses a different type of plunger/actuator to turn a generator as a result of tire flexure.

U.S. Pat. No. 5,767,663 to Lu uses a means for more or less straightforwardly inducing current flow in a wire as a result of wheel movement.

The prior art is not confined to the rim of the vehicle wheels. Thus, changing tires and otherwise working upon the wheel is made priorly difficult.

Contrary to the prior art, the instant invention can provide both fluid and electrical power generation in one vehicle both during acceleration and regenerative braking. It is a run-flat type tire that adds safety to the vehicle operation. Both features protect the power generation components of the instant wheel assembly, especially if the tire should fail.

BRIEF DESCRIPTION OF THE DRAWING

FIG. 11 is a detail of the drive gearing for a fluid motor version of the instant invention.

FIG. 12 is a cross section view of the gearing of FIG. 11.

DESCRIPTION OF THE PREFERRED EMBODIMENT

Figure 1:
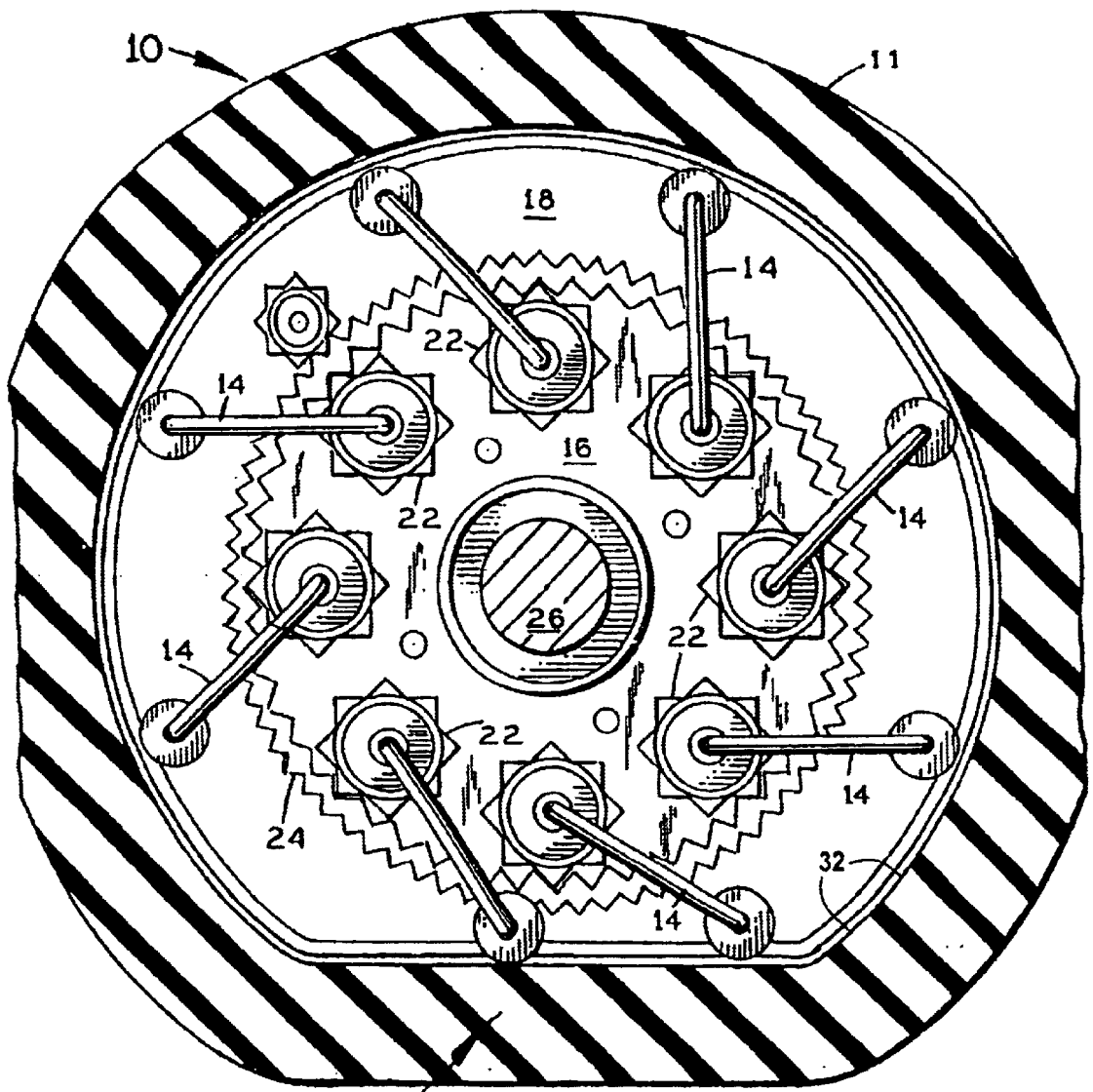
FIG. 1 is a plan view of the invention using ratchets and levers.

Turning to FIG. 1, we see a weight-powered wheel 10. The force of gravity pulling on the mass of a vehicle such as an automobile causes tire with its interior donut 32 to deflect 12 when the wheel 10 turns the rubber of the tire 11 against the ground. This deflection 12 is well known and is normally used to absorb some shock forces so to produce a smoother ride for the passengers of the vehicle using the wheel 10.

A plurality of levers 14 are supported by the rim 16 of power-producing wheel 20 located within the pneumatic interior 18 of wheel 10.

Figure 2:
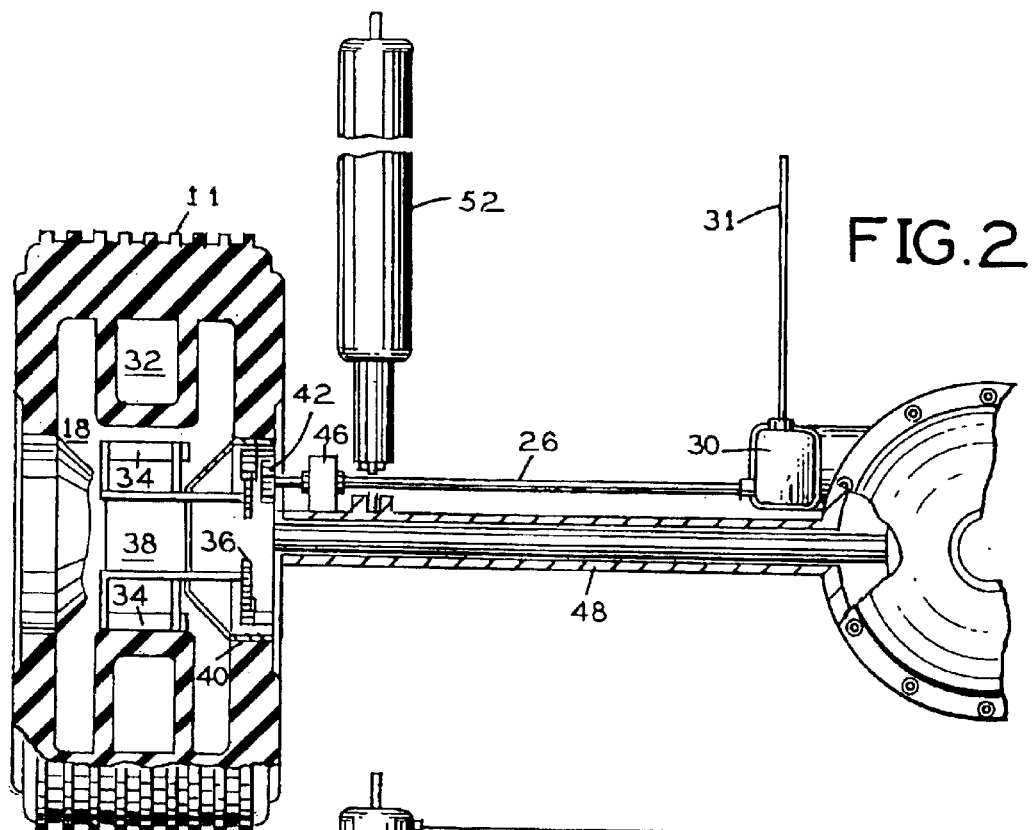
FIG. 2 is a cutaway view of the invention showing the power generating means.

Rim 16 has a plurality of ratchet gears 22 that articulate with a common ring gear 24. Gear 24 is shown located at the periphery of the internal diameter of the rim 16 and tire bead. Gear 24 drives linkage 26, which is either a mechanical linkage in the form of an axle or a hydraulic linkage in the form of at least one hydraulic conduit, which is connected to weight-powered gearbox 30 (FIG. 2). Gearbox 30 may then be used to help turn the vehicle driveshaft either via electric motor 50 (FIG. 9) and driveshaft dynamo or hydraulic motor 50. (FIG. 11)

Axle 26 (FIG. 2) is a hydraulic motor located at each wheel as against the one or more hydraulic motors located at the driveshaft and differential. Element 26 in FIG. 2 is a pair of hydraulic conduits. These allow the invention gearbox to be replaced by a hydraulic motor (Master Hydraulic Motor) 50 at the differential that receives fluid from all four wheel motors 46. An hydraulic bypass line 32 in or at motor 50 would redistribute fluid to an hydraulic air compressor or electric generator when excess power is to be stored (not shown). While cruising, most of the fluid from the wheel motors would bypass the Master Hydraulic Motor 50 to the power storage motor. When the brake is applied, the Master Hydraulic Motor 50 is switched to a hydraulic pump driven by the kinetic energy in the vehicle driveshaft to recover regenerative braking energy to the energy storage system (either compressed air or electricity).

The air compressor charges an air receiver that is then used to drive a well known air motor (not shown).

Air motors are known art and have successfully self-powered at least one prior art vehicle called the e.Volution car, put out by Zero Pollution Motors of France.

Alternatively, the air receiver may simply boost the hydraulic drive line pressure.

Lever 14 when activated by the tire deflection 12 turns ratchet gears 22 which then turns ring gear 24 separately from the spin of tire 11. It is the spin of gear 24, separate from that of wheel 10, that turns axle 26.

Turning to FIG. 2, tire 11 interior space 18 contains an interior non-deflatable donut 32 that pushes on Interior ratchet gear lever roller 34 when it itself is pushed inwardly by tire deflection 12. Thus the energy of deflection 12 is transferred to roller 34, which then turns ratchet gears 36 located on the inner wheel rim 38. Gears 36 then turn ring gear 40, which powers the axle gear 42, which turns axle 26.

Exterior hydraulic wheel motor 46 is shown attached to vehicle axle housing 48 to provide hydraulic fluid pumping power from its wheel to the hydraulic generator 50 or the Master Hydraulic Motor 50 to provide power assist and/or power assisted braking; or to the hydraulic air compressor or electric generator to provide power storage. The assist is then used to increase vehicle gas mileage, decrease electric motor power needs and otherwise help in moving and/or braking the vehicle.

Figure 3:
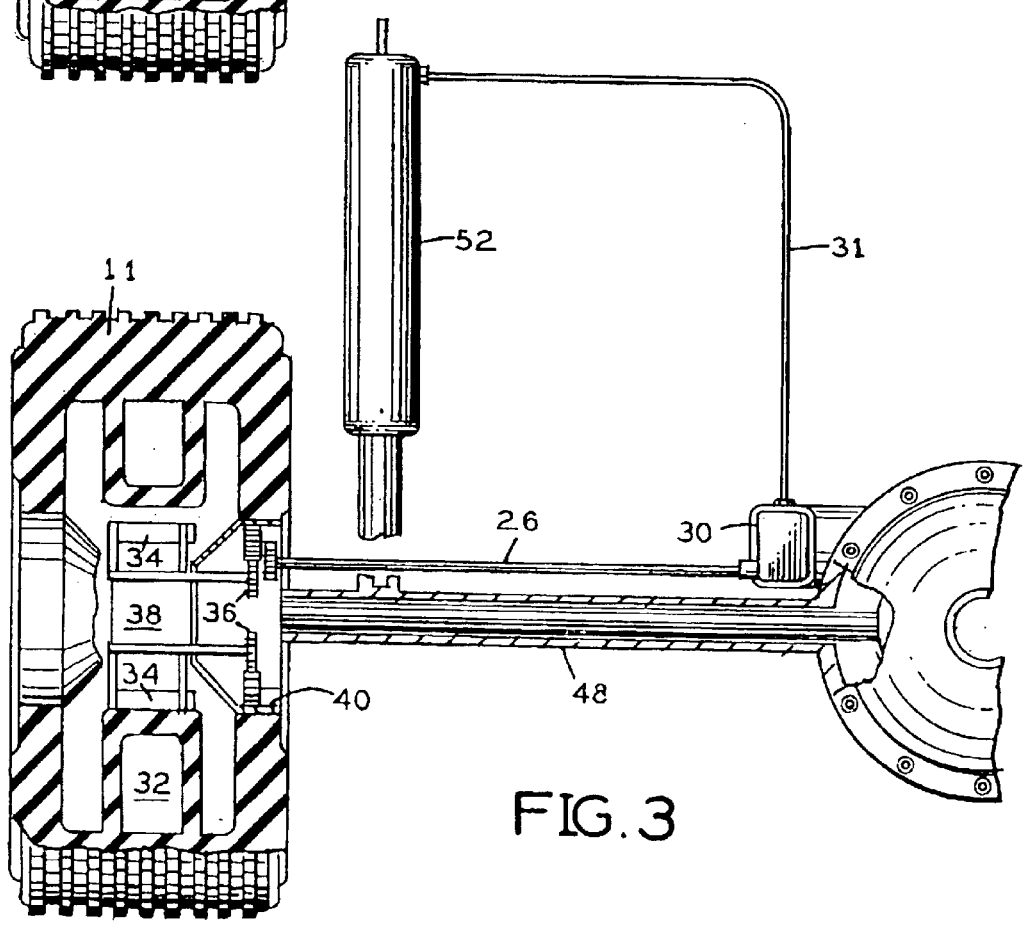
FIG. 3 is a cutaway of the invention of FIG. 2 without a fluid motor.
Figure 4:
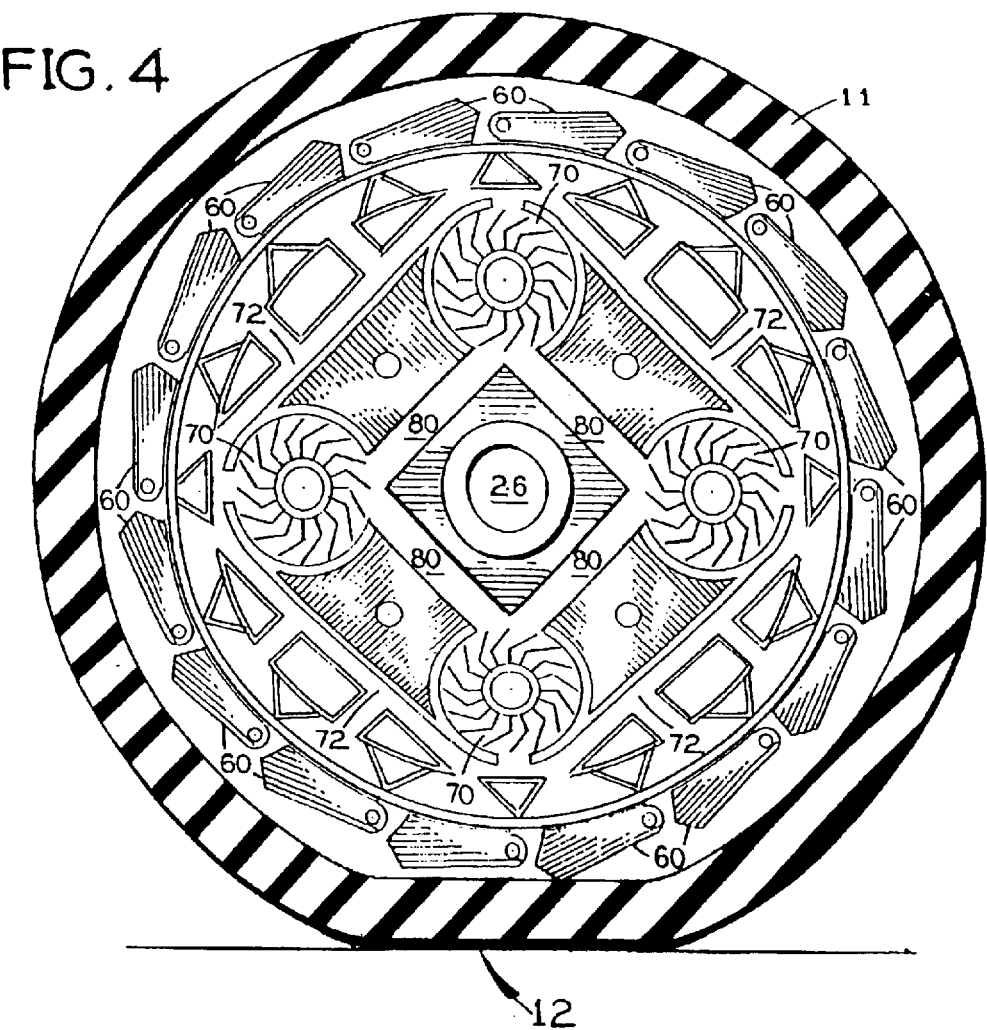
FIG. 4 is a cutaway of the Invention showing fluid flow paths and a lever and bellows system.

FIG. 3 shows motor 46 gone while line 32 feeds strut 52. The hydraulic fluid pressure in strut 52 is used to automatically modulate or adjust the gear ratio so that the power harvested from axle 26 can be matched to a specific percentage of vehicle weight. The heavier the vehicle, the more power it produces when it closes the donuts:

In FIG. 4, a plurality of hydraulic donuts, bellows or pistons 60 are placed upon rim 16. A different configuration of pistons 60 is shown in FIGS. 5 and 6.

Figure 5:
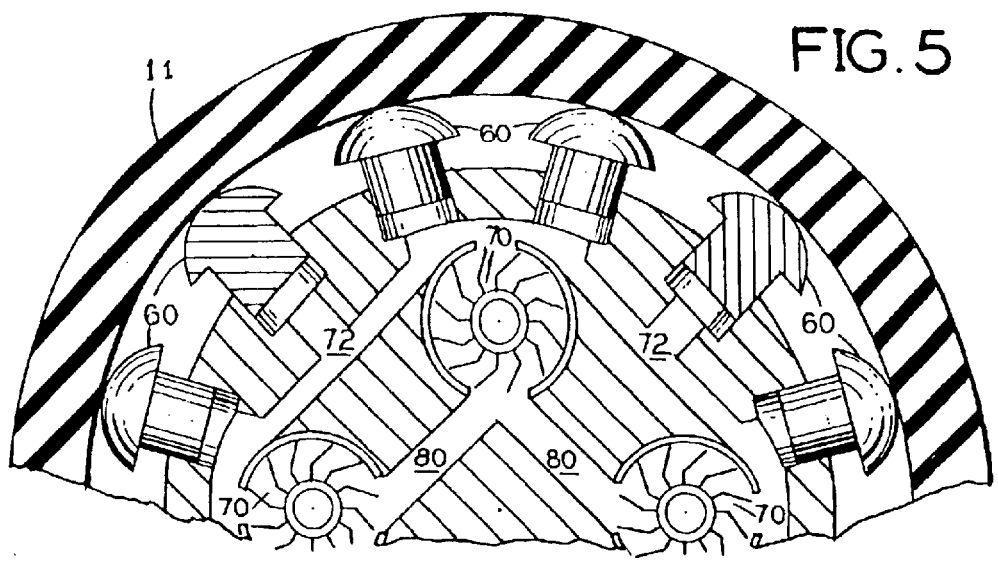
FIG. 5 is a cutaway of the Invention showing the fluid flow paths of FIG. 4 with internal hydraulic motors and a plunger system.
Figure 6:
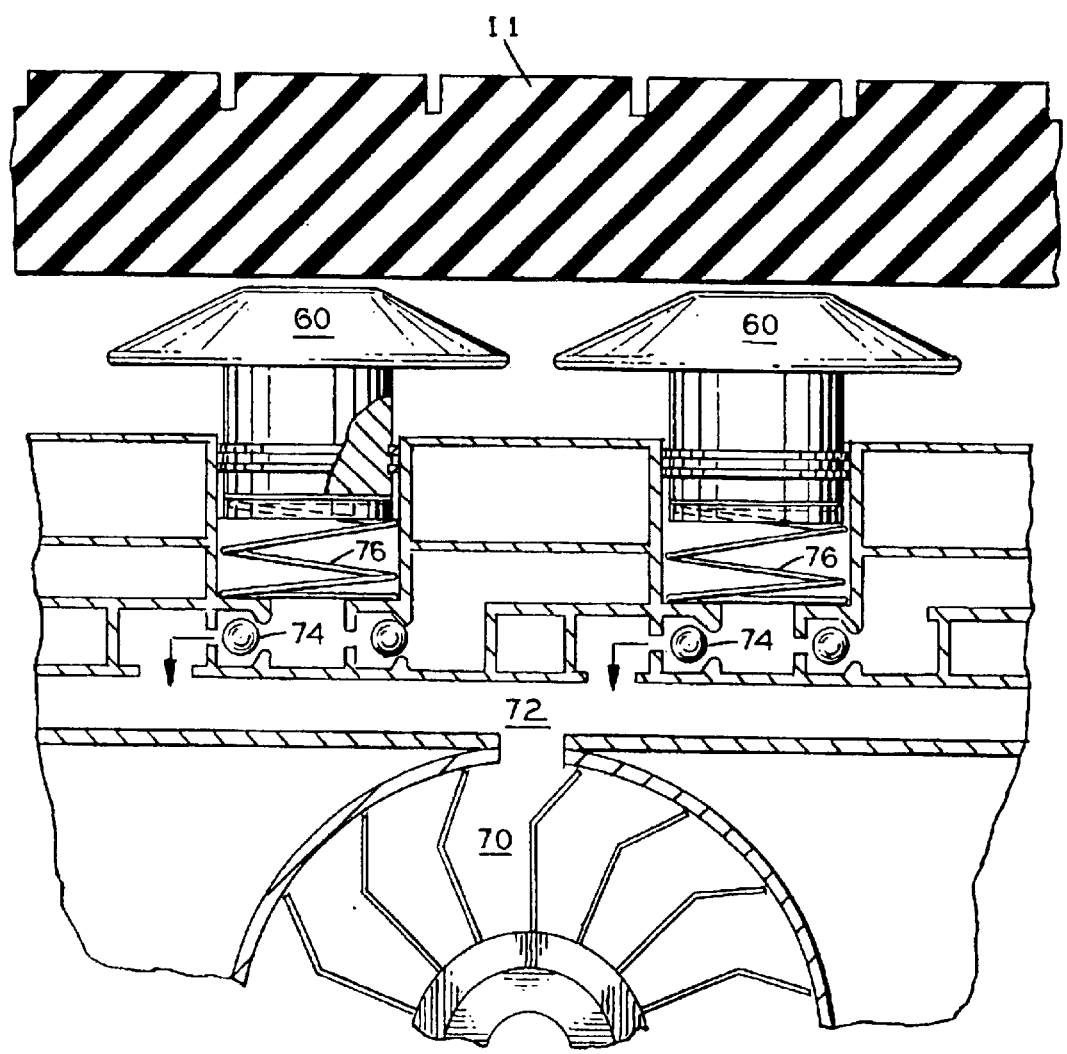
FIG. 6 is a cutaway of the invention showing a close-up of a plunger system.
Figure 6A:
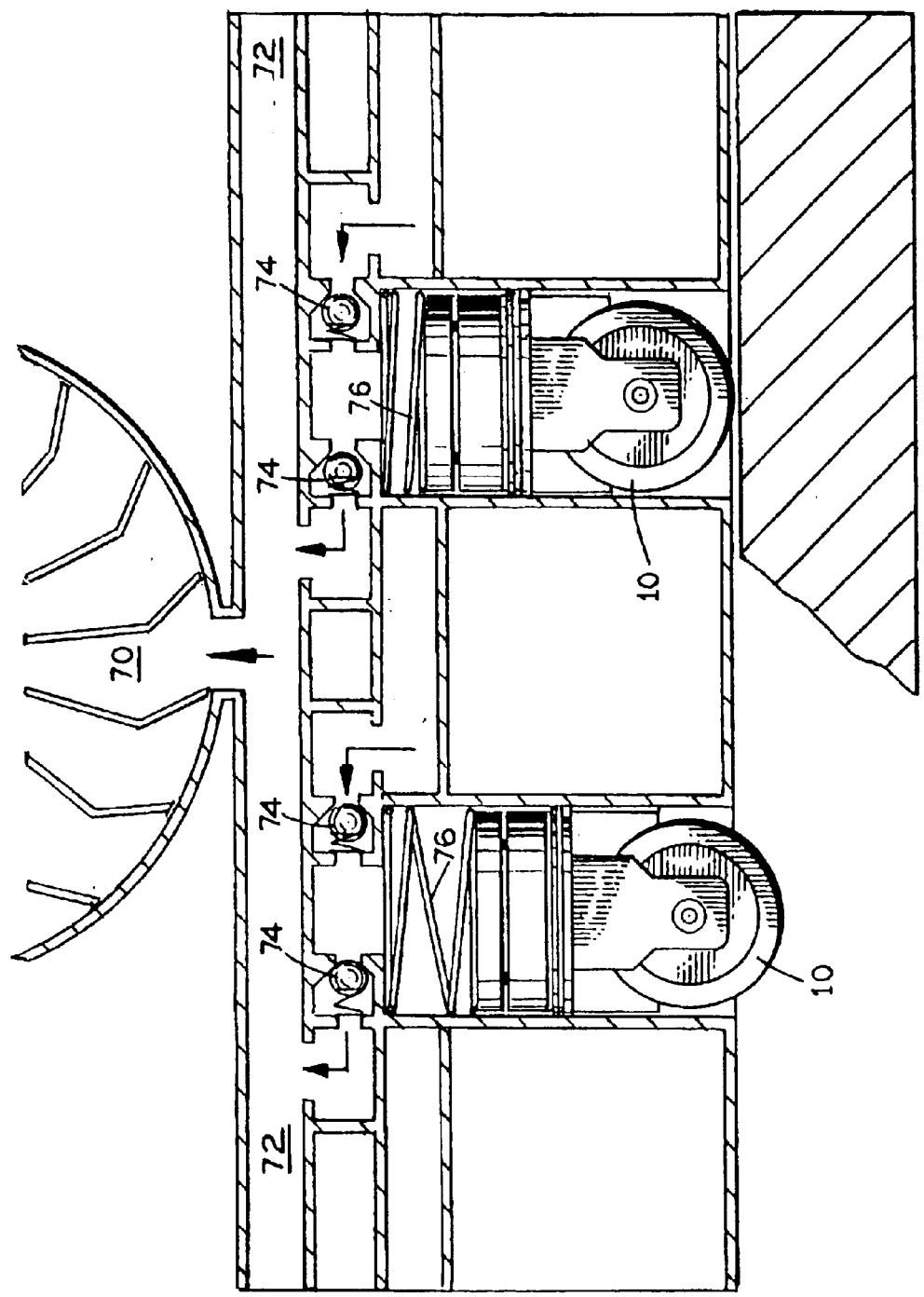
FIG. 6A is an elevation showing the invention used on steel wheels that travel on steel rails.

The configurations of FIGS. 4–6 are activated by interior donut 32 as the tire 11 itself and donut 32 deflect at 12. Donut 32 is attached all around the tire interior. It does not matter whether these configurations are applicable to road wheels or train wheels. The instant invention has the ability to add power to all moving vehicles.

Internal hydraulic motors 70 are driven by common hydraulic output duct 72 which is fed by one-way valve 74. Ball valves 74 are shown, but any suitable valve 74 may be used. Springs 76 (shown in FIG. 6), in conjunction with the return fluid pressure, push pistons 60 back Into waiting position after they pass through deflection 12.

Figure 7:
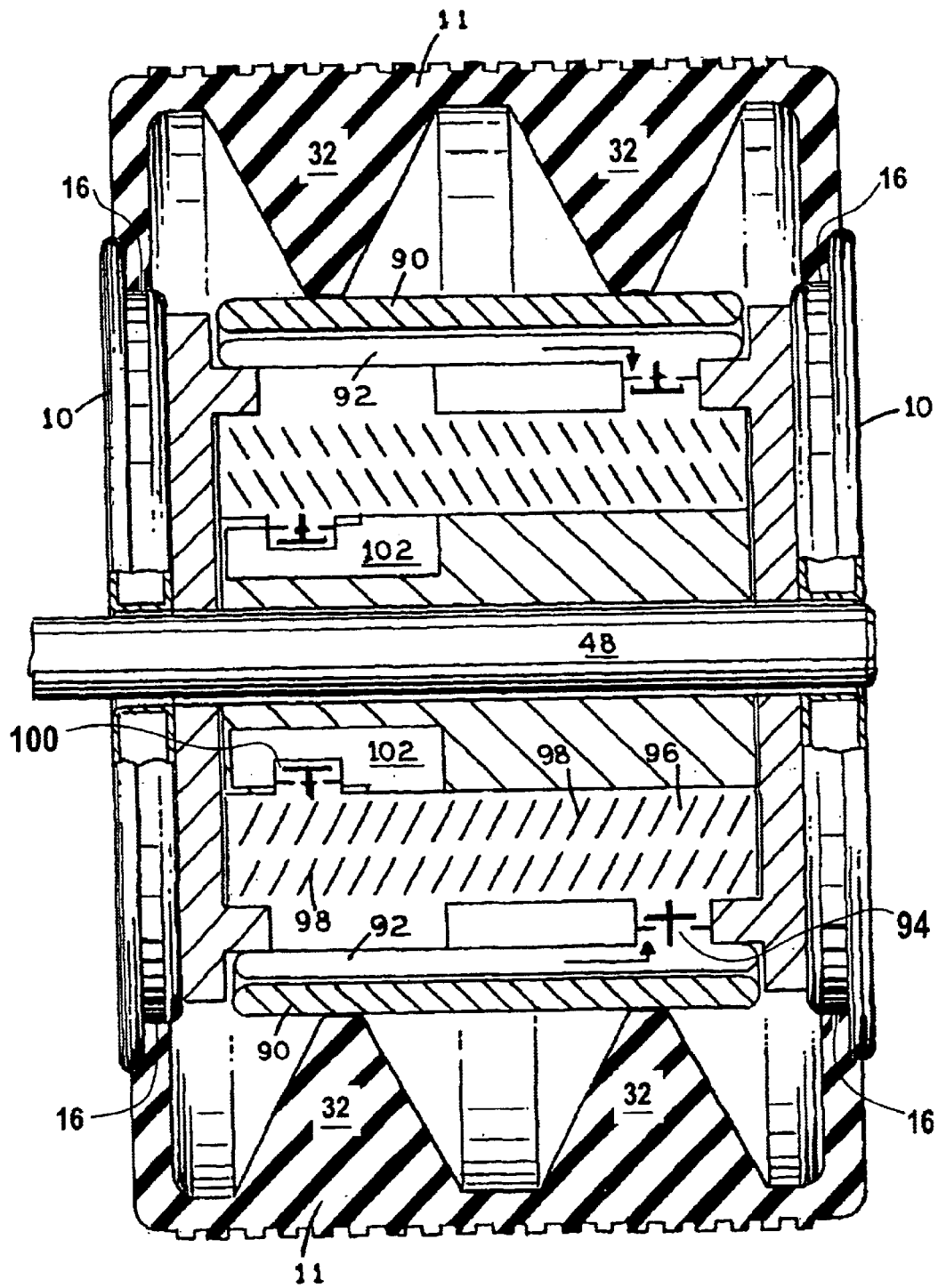
FIG. 7 is a cutaway of the wheel hydraulic bellows system.

FIG. 7 shows a solid tire donut 32. The donut 32 may otherwise be made inflatable (FIGS. 2, 3) if so desired. Doing so would endanger the invention's run-flat abilities. Donut 32 may also have a hard or spongy texture depending upon power production vs. passenger comfort requirements. The donut 32 may otherwise be made hollow (FIGS. 2, 3).

Here donut 32 pushes on bladder compression bar 90 at the deflection 12. Bar 90 compresses interior bladder 92. Interior donut 92 then squeezes fluid through one-way valve 94. Once fluid passes through valve 94, it activates interior hydraulic motor 96 having vanes 98. The fluid then passes out one-way valve 100 into fluid return duct 102.

The center axle in FIG. 7 is the vehicle's axle 48.

All fluid power can be transmitted to gearbox 30 either by axle 26 or via typical direct hydraulic tubing (not shown) instead. The same option occurs for powering the hydraulic motor 50.

Figure 8:
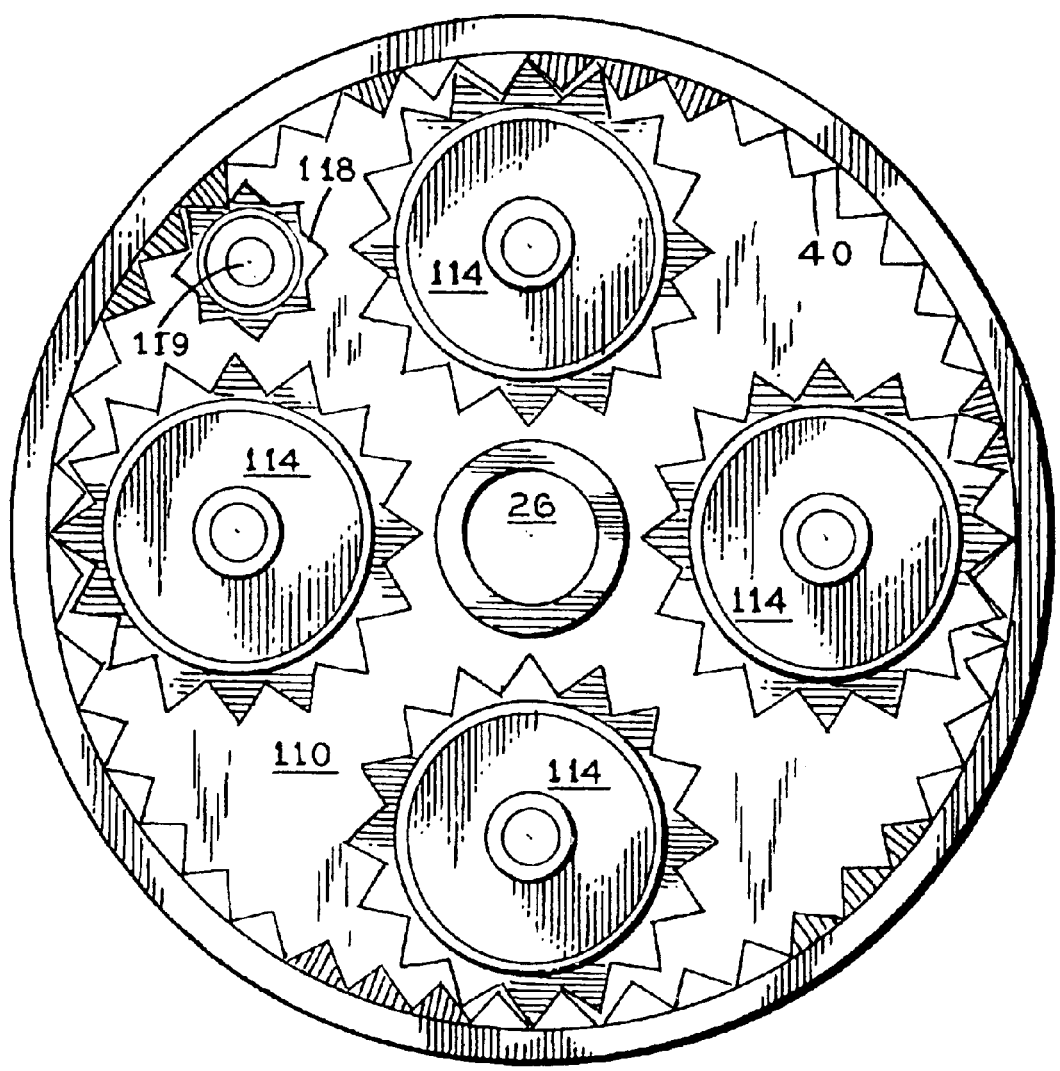
FIG. 8 is a plan view of the wheel internal fluid motor external ratchet gears, ring gear and invention driveshaft gear.

FIG. 8 shows interior hydraulic system cover plate 110 having ring gear 40 operated by interior hydraulic motor gears 114 and the gear 118 for the exterior hydraulic motor axle 119 or the invention's gearbox axle 26.

Figure 9:
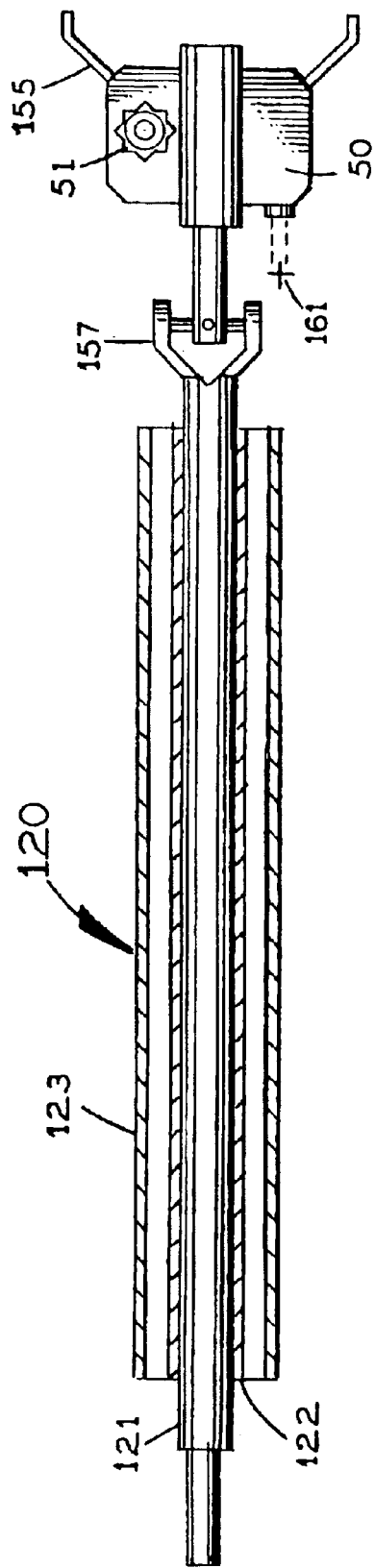
FIG. 9 is partial cutaway of a direct electromagnetic linear generator with the driveshaft dynamo.

FIG. 9 shows linear Induction driveshaft dynamo 120. Axle 121 serves as the rotor having windings or permanent magnets 122 while stator windings 123 surround them. Through suitable and well-known means, electric energy is produced and can then be fed into the stator winding 123 of driveshaft dynamo 120 surrounding the vehicle driveshaft 121. The windings on the vehicle driveshaft 121 serve to directly propel the vehicle as the rotor energizing stator 123 induces a magnetic torque on driveshaft 121 rotor windings or permanent magnets. Thus the induced torque provides vehicle propulsive power.

Figure 10:
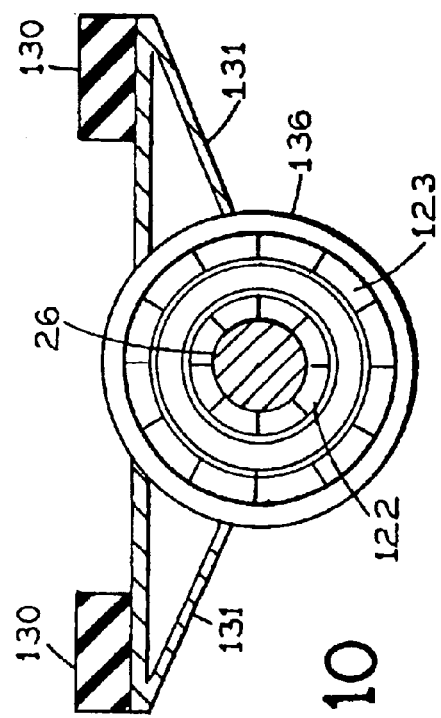
FIG. 10 is a cross section view of the driveshaft dynamo of FIG. 9.

FIG. 10 shows the system of FIG. 9 (in cross section) cutaway. Driveshaft 121 is in the center with its own windings or permanent magnets 122. Thus, the induced torque provides propulsive power.

Driveshaft 121 has rubber mounts 130 for the driveshaft mount 131. Shaft 121 is in the center with its own windings 122. Stator windings 123 surround them. Protective casing 136 is enclosing the works.

Hydraulic motor 50 may here be alternator 50 having alternator drive shaft 51 (which is the same as driveshaft 26 and 119). Differential casing 155 shows the location relative to the vehicle.

Universal joint 157 may remain exactly the same as the usual vehicle design in the dynamo driven electrical 120 power systems or may be modified to accept gear 180 that is driven by the hydraulic motor 50 in the hydraulic drive system. Gear 180 may instead be incorporated into a modified differential drive shaft as shown in FIG. 11. The hydraulic air compressor could be located on the driveshaft 121 in an arrangement similar to the dynamo 120 (FIG. 12) where it could function as a second hydraulic power assist motor in addition to its functions as a power storage pump driven by either the wheel hydraulic fluid that bypasses the Master Hydraulic Motor 50, by compressed air from storage or by the driveshaft itself in a regenerative braking energy recovery role. Direct fluid intake and output via ports(s) and tube(s) 161 to and from Master Hydraulic Motor 50 as shown. Tube 161 is in phantom as it can be either an alternative to the electric feed or it can also be an adjunct for delivering even more power overall.

Finally, FIG. 11 shows Master Hydraulic Motor 50 output shaft 51 running bevel gears 180 which drive the vehicle via the differential 155 or the universal joint 157. This depends upon the exact placement of Master Hydraulic Motor 50 upon driveshaft 121. FIG. 12 is a view of the bevel gears 180 or the driveshaft installed hydraulic air compressor.

It should be noted that the wheel levers and pumps 46, 50 and 60 when loaded with more weight produce more hydraulic power. Also the faster the vehicle travels, the more power it produces. The hydraulic modulation of strut 52 is based on loaded vehicle weight. As such, depending upon vehicle weight and speed, the Instant Invention may in fact generate more power then the vehicle needs. This is not available in the prior art. The extra power may be used to charge batteries, spin a superflywheel or even be traded by magnetic induction with the ground or rails, catenary or whatever is useful and put back into the electric power Infrastructure. Induction coils on the vehicle will interact via magnetic lines of force in a well-known manner with other coils or super magnets in the ground, etc so to transfer the extra electrical power. Here is a time when the vehicle can operate without fueling stops. Using magnetic induction and actively transferring electrical power to the vehicle from the ground or rails placed upon the ground, the vehicle can be powered directly without refueling stops.

IN OPERATION, mechanical linkages or fluid pressure (pneumatic, hydraulic or any suitable system made after the manner of the Instant invention) via pumps 60 in various configurations, is made to run either an alternator, a fluid motor 50 or an excess fluid pressure receiver for boosting either drive line pressure or directly driving the vehicle driveshaft itself.

Onboard electric generation is directly accomplished via the instant driveshaft dynamo. Fluid pressure operated generator can also produce electricity onboard the vehicle.

Both fluid pressure and dynamo output can be directed to top off energy storage devices such as batteries and/or superflywheel, or the like.

Pneumatic power storage is the safest of all storage options and has the capability of propelling vehicles all by itself.

Thus, an environmentally friendly and useful vehicle powering system for both long and short runs is capable of being produced and could be designed to retrofit existing railroad ICE-type vehicles with minimal disturbance of prevailing vehicle designs and components.

It should be understood, of course, that the foregoing relates to preferred embodiments of the invention and that modifications may be made without departing from the spirit and scope of the invention as set forth in the following claims.

We claim:

1. A gravity-fed, tire pumped, vehicle energy generating power wheel, comprising:

an axle on a vehicle;

a wheel on said axle;

a tire on said wheel having deflection characteristics;

a pump mechanism for activation by said tire when said tire is characterized by said deflection;

said pump mechanism operating via a mechanical linkage, the operation of said mechanical linkage being activated by a ratcheting gear system operable by said deflection; and said mechanical linkage activating at least one of: power generator, at least one hydraulic motor and at least one pneumatic power device.

2. The power wheel of claim 1 wherein said pump mechanism comprises levers activating at least one ratchet gear;

said ratchet gear activating a ring gear;

said ring gear driving an axle; and said axle driving at least one of: power generator, at least one hydraulic motor and at least one pneumatic power device.

3. A gravity-fed, tire pumped, vehicle energy generating power wheel, comprising:

an axle on a vehicle;

a wheel on said axle;

a tire on said wheel having deflection characteristics;

a pump mechanism for activation by said tire when said tire is characterized by said deflection;

said pump mechanism pressurizing a hydraulic linkage;

said hydraulic linkage pressurization activated by a ratcheting gear system operable by said deflection; and said hydraulic linkage activating at least one of: power generator, at least one hydraulic motor and at least one pneumatic power device.

4. The power wheel of claim 3 wherein said pump mechanism comprises means for directly activating a hydraulic motor and said motor is placed upon said wheel.

5. The power wheel of claim 3 wherein said pump mechanism comprises hydraulic gearing.

6. The power wheel of claim 3 wherein said pump mechanism comprises hydraulic cylinder pumps.

7. The power wheel of claim 3 wherein said pump mechanism comprises means for activating at least one internal donut located within the pneumatic space of said tire.

8. The power wheel of claim 3 wherein said pump mechanism comprises means for transmitting said generated energy directly via hydraulic tubing.

9. The power wheel of claim 3 wherein said pump mechanism comprises at least one hinged donut compression bar pressurizing a hydraulic duct system internal to said tire;

said duct system operating at least one hydraulic motor placed interior to said tire; and said motor having means for operating a hydraulic linkage.

10. The power wheel of claim 3 wherein said pump mechanism is modulated by fluid pressure in a strut for gearbox modulation based upon the overall weight and speed of said vehicle.

11. The power wheel of claim 3 wherein said driveshaft serves a linear induction driveshaft dynamo motor;

said dynamo motor having a rotor around said driveshaft;

a dynamo stator is fitted around said rotor; and means for drawing off and using electricity produced by said rotor and stator;

wherein said electricity is used for decreasing said power needs of said vehicle.

12. The power wheel of claim 11 wherein said wheel has active power trading between road or rail surfaces via magnetic induction wherein said trading can produce operations of said vehicle without fueling stops.

13. The power wheel of claim 11 wherein said dynamo can be activated to generate electricity during deceleration of said vehicle.

14. The power wheel of claim 11 wherein said dynamo has means for storing said generated electricity in at least one choice of superflywheel, battery and other means for storing and using said electricity.

15. The power wheel of claim 11 wherein said hydraulic linkage is used to pump up an air receiver for activation of an air motor; said air motor boosting hydraulic pressure, and directly turning the driveshaft of said vehicle.

16. A power generating wheel on a vehicle, comprising:

means for employing at least one ratcheting device within the interior of a deformable tire placed on said wheel;

means for using said deformable tire to activate said ratcheting device;

means for driving an driveshaft by said ratcheting device; and

Means for driving at least one gearbox, and at least one hydraulic motor by said driveshaft.

17. The power generating wheel of claim 16 wherein said driveshaft has means for generating electricity.

18. The power generating wheel of claim 16 wherein said driveshaft has means for generating pneumatic pressure via hydraulic activation by said wheel.

19. The power generating wheel of claim 16 wherein in said wheel activates a hydraulic motor.

* * * * *